March 22, 1960 H. L. MUELLER 2,929,431
RIM FOR TUBELESS TIRE
Filed June 14, 1955
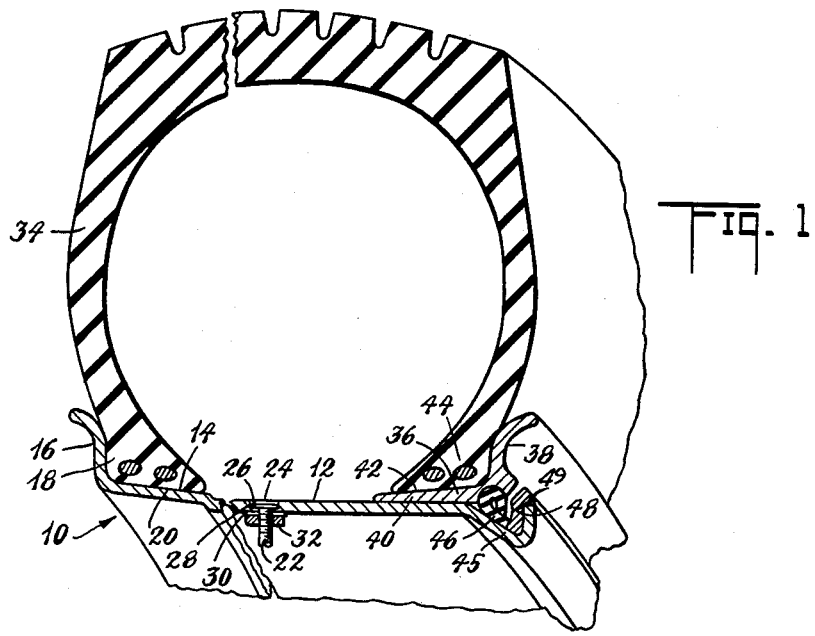
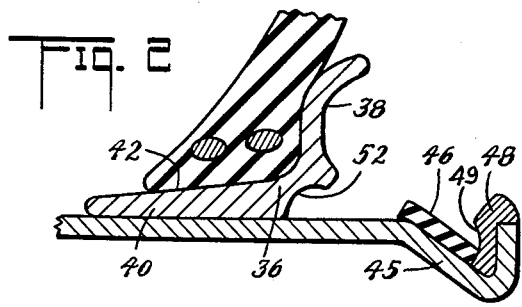
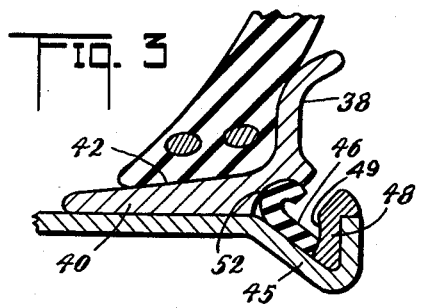
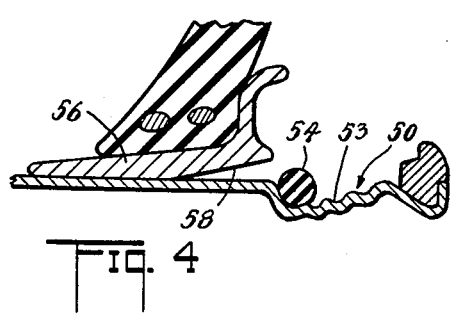
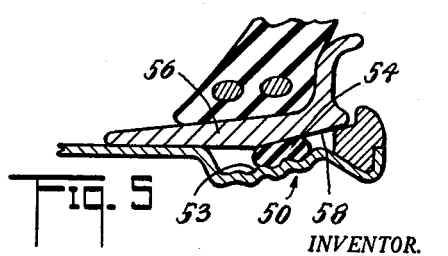
INVENTOR.
HOMER L. MUELLER
BY
*Tennes J Erstad*
ATTORNEY

United States Patent Office 2,929,431
Patented Mar. 22, 1960

2,929,431
RIM FOR TUBELESS TIRE

Homer L. Mueller, Rocky River, Ohio, assignor to American Machine & Foundry Company, a corporation of New Jersey Application June 14, 1955, Serial No. 515,425

3 Claims. (Cl. 152—410)

This invention relates to rim assemblies for tubeless pneumatic tires.

One of the problems with respect to using tubeless tires more extensively, especially for trucks, has been the problem of preventing the loss of pressure in the tire, especially when the tire is subjected to the rough usage that is encountered by tires employed on trucks.

It is an object of this invention to provide a rim that is particularly well suited for use with a tubeless tire which will effectively prevent the loss of air in the tubeless tire, even when used on trucks.

A further object of this invention is to provide a flat rubber sealing ring which will be of simple design, economical to manufacture and still allow for variations in the diameter of the tire ring and rim on which tubeless truck tires are mounted.

Another object of this invention is to provide a rim assembly for a tubeless tire wherein the sealing ring will be rolled over a cam surface having pockets formed therein into which the sealing ring is seated to effect an airtight seal between the side ring and the rim base.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 is a fragmentary cross-sectional perspective view of an inflated conventional tubeless and pneumatic tire mounted on a tubeless tire rim assembly embodying the invention.

Fig. 2 is a partial cross-sectional view of the side ring before the tire has been inflated and the tire ring moved outwardly to roll the flat sealing band into an endless roll.

Fig. 3 shows the pneumatic tire partially inflated with the side ring partially moved out into contact with the endless sealing ring.

Fig. 4 shows a modified embodiment of the invention employing a corrugated camming surface used in combination with an endless sealing ring before the tire is inflated.

Fig. 5 shows a modified embodiment of the invention employing a corrugated camming surface used in combination with an endless sealing ring after the tire has been inflated.

The rim I have chosen to illustrate the invention consists of a flat, endless rim base 10 having a flat portion 12 and an inclined portion 14 which may be provided with a suitable tapering incline (as for example of 5°) on which a tire bead is seated.

An upwardly extending flange 16, conforming to the outside configuration of the tire bead 18, is formed on the outside inclined portion 14 of the tire rim 10. It will be noted that the bottom portion 20 of the tire bead 18 conforms to the configuration of the inclined portion 14 of the rim base 10, so that when the tire bead is forced outwardly because of the inflation of the tubeless tire it squeezes and seats itself tightly on the inclined portion 14 up against the inside curve portion of the flat flange 16.

The beads of the tubeless tires are provided with a conventional rubber sealing material which will prevent air from escaping out between the bead and the surfaces against which the bead is seated.

The center portion of rim base 10 has a hole through which a conventional valve stem 22 extends. The stem 22 has a flange 24 set in a seat 26 formed in the base 10. The suitable gaskets 28 and 30 shown in Fig. 1 may be positioned on opposite sides of the base to prevent air from escaping from around the valve stem 22. A conventional nut 32 is employed for firmly holding the valve stem 22 and flange 26 on the rim base 10.

When the tire 34 has been inserted over the rim base 10, an endless ring 36 is slid over the flat portion 12 of the rim base 10. A slight clearance of approximately $\frac{1}{32}$ to $\frac{1}{16}$ inch is allowed between the side ring 36 and the adjoining surfaces of the flat portion 12 of the rim base 10 to enable the ring to readily slide in and out on the flat portion of the rim base 10. The side ring 36 is formed with a flange 38 having a configuration conforming to the sides of the opposite tire bead of the tubeless tire 34.

The lower side of the side ring 36 has a horizontal foot 40 the upper surface 42 of which is made with an inclined 5° rise similar to the other tapered side 14 of the rim base 10. The tapered side of the foot 40 conforms to the taper on the bottom of the bead 44 so that when the bead is squeezed outwardly it seats itself tightly on the foot 42 up against the flange 38 preventing air from escaping between the bead and the side ring. It will also be noted that the tapered foot 42 occupies the same level as the inclined portion 14 of the rim base 10. This is accomplished because the flat portion of the rim 12 is positioned slightly below the incline 14.

The other side of the rim base 10 has a descending gutter portion 45 into which is placed a sealing ring 46 and a split locking ring 48 formed with an inner groove 49 for engaging with the sealing ring. The sealing ring 46 consists of a flat rubber ring as shown in Fig. 2.

The side ring 36 is formed at its bottom portion with a curling pocket 52 which is of such configuration that it engages the flat rubber ring 46 and immediately commences to roll the sealing ring 46.

In Fig. 2 I have shown the position of the side ring before the tubeless tire has been inflated and before the ring 36 has engaged with the flat rubber sealing ring 46. In Fig. 3 I have shown the side ring 36 after it has been moved outwardly due to the partial inflation of the tire. At this point it has just begun to roll, due to the shape of its curling pocket 52, the flat rubber sealing ring 46 into a roll. When the tire has been completely inflated, as shown in Fig. 1, the sealing ring is rolled still more, tending to form a roll held in intimate contact with groove 49 of the locking ring 48 and the surface of the curling pocket 52.

One of the advantages of making a sealing ring in the form of a flat strip of rubber and then rolling it when the tire is inflated is that the sealing material is placed under torsional tension, which is maintained as long as the side ring is held in this condition. This tension effects an airtight seal between the gutter 45 and by means of groove 49 of locking ring 48, the side ring 36 at all times to prevent the escapement of air between the side ring 36 and the rim base 10, and automatically allows for any variation in the configuration of either the base 10 or the side ring 36 because as shown in Fig. 1, the sealing ring 46 maintains a clearance between the side ring 36 and the locking ring 48.

Figs. 4 and 5 show a modified form of the invention wherein an inclined corrugated or stepped camming surface is provided over which an endless sealing ring is rolled outwardly by the side ring when the pneumatic tire is inflated. As the side ring engages the sealing ring it rolls it outwardly, and the ring is progressively squeezed tighter as it rolls outwardly into succeeding corrugations.

The rubber sealing ring 54 may be substantially round in cross-section, such as that disclosed in co-pending application of Tennes I. Erstad, Serial No. 515,376 filed June 14, 1955, or it may be made from a flat strip of rubber such as shown in Figs. 1–3 of the present application.

In the modified form of the invention shown in Figs. 4 and 5, the inclined cam surface 50 is provided with steps or corrugations 53 over which the sealing ring 54 is rolled. As the side ring 56 moves outwardly the cam surface 58 comes into contact with the sealing ring 54 which may be made from rubber or other suitable material. As the cam surface 58 moves outwardly the space between the cam surface 50 and the cam surface 58 becomes progressively smaller. During the actual outward movement of the side ring 56 a rolling action is imparted to the sealing ring 54. As the sealing ring moves outwardly it rolls from one depression to the next depression and seats itself over these corrugations which may be so spaced that the sealing comes to rest in one of the depressions.

An advantage of this embodiment is that not only is a progressive rolling action obtained on the rubber, but the depressions in the cam surface coact with the sealing ring to effect a tight seal. Also, even if there is a tendency to move the side ring either outwardly or inwardly, as when the truck goes over a rough road, the sealing ring is subjected to increased squeezing action either as it goes up the incline of a corrugation as one side ring moves inwardly or as it is squeezed by the inclined cam surface 58 when moving outwardly. The distortion of the sealing ring in the manner provided, rather than just ordinary compression, helps maintain life in the sealing ring so it can effectively perform its sealing function.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A rim assembly for a tubeless tire, comprising a rim base, a tubeless tire, a bead-engaging flange formed along one side of said rim base for supporting one bead of said tire, a gutter extending around the opposite side of said rim base, said gutter having an inclined surface, a bead-supporting side ring formed at its bottom portion with a curling pocket and mounted for sliding movement on said rim base for supporting the other bead of said tire, an endless flat sealing ring mounted in said gutter, said sealing ring being substantially wider in cross-section than it is thick and lying in a substantially horizontal position on said inclined surface, said sealing ring having one edge extending above the upper inclined surface of said gutter in the direction of the tubeless tire so that it will be engaged by said side ring as it is moved outwardly when the tire is inflated to effect a curling action on the flat sealing ring and to form an air seal between the side ring and the rim base, and a split locking ring having an inner face adapted for contact with said sealing ring and mounted in said gutter for limiting the extent said side ring can move outwardly.

2. A rim assembly for a tubeless tire, comprising a rim base having a gutter formed on one side, said gutter having an inclined surface, a side ring formed at its bottom portion with a curling pocket and mounted on said rim base, a split locking ring mounted in said gutter, said ring having an inner groove, a flat rubber sealing ring which is substantially wider in cross section than it is thick, positioned on the inclined surface of said gutter in between the curling pocket of said side ring and the split locking ring, said rubber sealing ring maintaining said side ring and said locking ring in spaced relationship with one another, thereby allowing for variations in the configuration of said rim base and said side ring, and a tubeless tire mounted on said rim base and side ring, means for inflating said tubeless tire to cause the side ring to move outwardly into engagement with the flat rubber sealing ring so as to roll the flat rubber into a roll to seal air from escaping between the side ring and the gutter of the rim base.

3. A rim assembly for a tubeless tire comprising a rim base having a gutter on one side thereof and having a declining surface formed on one side of said gutter, a side ring slidably mounted on said rim base for supporting the bead of a tubeless tire and formed at its bottom portion with a curling pocket, a flat endless strip of rubber which is substantially wider in cross-section than it is thick, positioned on said rim base up against said side ring, said flat strip of rubber lying on said declining surface of said rim base, a split locking ring positioned in the gutter of said rim base, and means for inflating said tubeless tire to move the side ring outwardly to roll and double the flat endless sealing ring on itself to form an air-tight seal between the side ring and the rim base.

References Cited in the file of this patent

UNITED STATES PATENTS

| 2,685,907 | Waddell | Aug. 10, 1954 |
| 2,790,476 | Herzegh | Apr. 30, 1957 |
| 2,827,100 | Herzegh | Mar. 18, 1958 |

FOREIGN PATENTS

| 1,080,891 | France | June 2, 1954 |

(Corresponding Great Britain, 725,767, Mar. 9, 1955)